(12) United States Patent
Iritsuki

(10) Patent No.: US 9,318,753 B2
(45) Date of Patent: Apr. 19, 2016

(54) FUEL CELL

(71) Applicant: Nissan Motor Co., Ltd., Kanagawa (JP)

(72) Inventor: Keita Iritsuki, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/384,563

(22) PCT Filed: Mar. 12, 2013

(86) PCT No.: PCT/JP2013/056790
§ 371 (c)(1),
(2) Date: Sep. 11, 2014

(87) PCT Pub. No.: WO2013/141079
PCT Pub. Date: Sep. 26, 2013

(65) Prior Publication Data
US 2015/0086899 A1 Mar. 26, 2015

(30) Foreign Application Priority Data
Mar. 21, 2012 (JP) .................. 2012-063075

(51) Int. Cl.
*H01M 2/02* (2006.01)
*H01M 8/02* (2006.01)
*H01M 8/10* (2006.01)

(52) U.S. Cl.
CPC .......... *H01M 8/0273* (2013.01); *H01M 8/0258* (2013.01); *H01M 2008/1095* (2013.01); *Y02E 60/50* (2013.01)

(58) Field of Classification Search
CPC .......................... H01M 8/0271; H01M 8/0273
See application file for complete search history.

(56) References Cited

U.S. PATENT DOCUMENTS
2009/0286136 A1  11/2009 Yamamoto et al.

FOREIGN PATENT DOCUMENTS

| JP | 2003-77499 A | 3/2003 |
|---|---|---|
| JP | 2006-19204 A | 1/2006 |
| JP | 2007-35296 A | 2/2007 |
| JP | 2007-294248 A | 11/2007 |
| JP | 2010-123377 A | 6/2010 |
| JP | 2010272474 A | 12/2010 |

OTHER PUBLICATIONS

Extended European Search Report issued in corresponding European Application No. 13764459.7, mailed Feb. 23, 2015 (7 pages).
International Search Report for corresponding International Application No. PCT/JP2013/056790, mailed May 21, 2013 (7 pages).

*Primary Examiner* — Jane Rhee
(74) *Attorney, Agent, or Firm* — Osha Liang LLP

(57) ABSTRACT

A fuel cell includes a membrane electrode assembly with a frame at a peripheral portion, and a separator disposed on both sides of the frame and the membrane electrode assembly. A protrusion and a counterpart groove where a tip of the protrusion is inserted are respectively formed on portions of the frame and the separator facing each other, and the tip of the protrusion is immersed in an adhesive that is injected in the groove such that the groove and the protrusion are joined to each other. A room is formed between the frame and the separator on the groove at least at a side of the protrusion closer to the membrane electrode assembly.

6 Claims, 4 Drawing Sheets

FUEL CELL

CROSS-REFERENCE TO RELATED APPLICATIONS

This application is a National Stage application of International Patent Application No. PCT/JP2013/056790, filed on Mar. 12, 2013, which claims priority to Japanese Patent Application No. 2012-063075, filed on Mar. 21, 2012. Both Japanese Patent Application No. 2012-063075 and International Patent Application No. PCT/JP2013/056790 are hereby incorporated by reference in their entirety.

TECHNICAL FIELD

The present invention relates to an improvement of fuel cells such as polymer electrolyte fuel cells (PEFCs).

BACKGROUND ART

A fuel cell of this kind is described, for example, in Patent Document 1. The fuel cell described in Patent Document 1 includes a membrane electrode assembly that is integrated with an insulating member at the peripheral portion, and separators that form gas channels between the membrane electrode assembly and the separators. The fuel cell is configured such that the insulating member is joined to the separators at respective flat portions by an adhesive member.

CITATION LIST

Patent Literature

Patent Document 1: Japanese Patent Unexamined Publication No. 2010-123377

SUMMARY OF INVENTION

Technical Problem

However, a problem with conventional fuel cells as described above is that the joining structure between flat portions cannot provide sufficient sealing between an insulating member and separators although it provides a certain level of sealing, and it has been required to solve the problem.

The present invention was made in view of the above problem with the prior art, and an object thereof is to provide a fuel cell including a membrane electrode assembly with the frame at the peripheral portion and a separator, in which the sealing between the frame and the separator is improved.

Solution to Problem

A fuel cell of the present invention includes: a membrane electrode assembly with a frame at the peripheral portion; and a separator disposed on both sides of the frame and the membrane electrode assembly. Further, the fuel cell is configured such that: a protrusion and a counterpart groove where a tip of the protrusion is inserted are formed respectively on portions of the frame and the separator facing each other, and the tip of the protrusion is immersed in an adhesive that is injected in the groove so that the protrusion and the groove are joined to each other, and a room is formed between the frame and the separator on the groove at least at a side of the protrusion closer to the membrane electrode assembly. With this configuration, the problem with the prior art is solved.

Advantageous Effects of Invention

According to the present invention, the sealing between the frame and the separator can be greatly improved in the fuel cell that includes the membrane electrode assembly with the frame at the peripheral portion and the separator.

DESCRIPTION OF EMBODIMENTS

Figure 1:
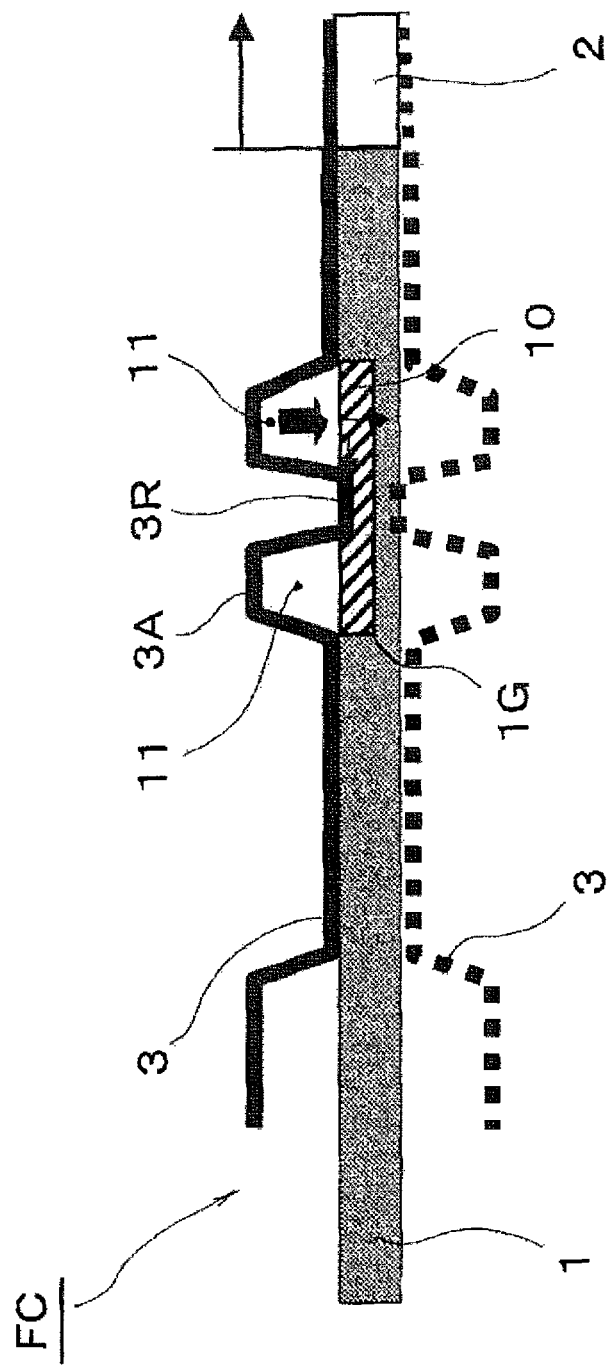
FIG. 1 is a cross sectional view illustrating an embodiment of the fuel cell of the present invention.
Figure 2:
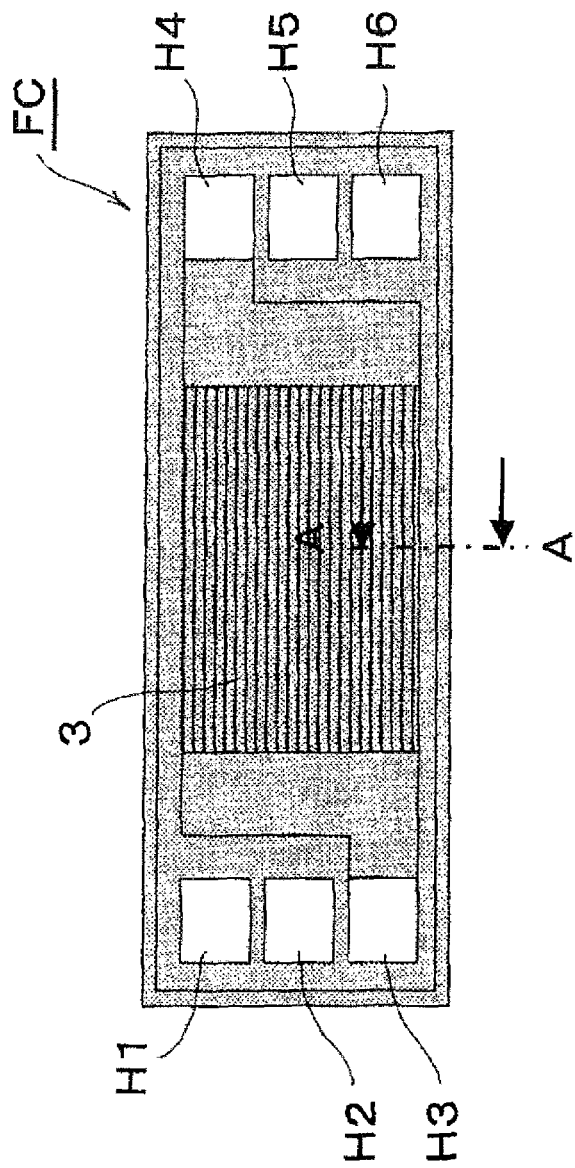
FIG. 2 is an exploded plan view of the fuel cell of FIG. 1.
Figure 3:
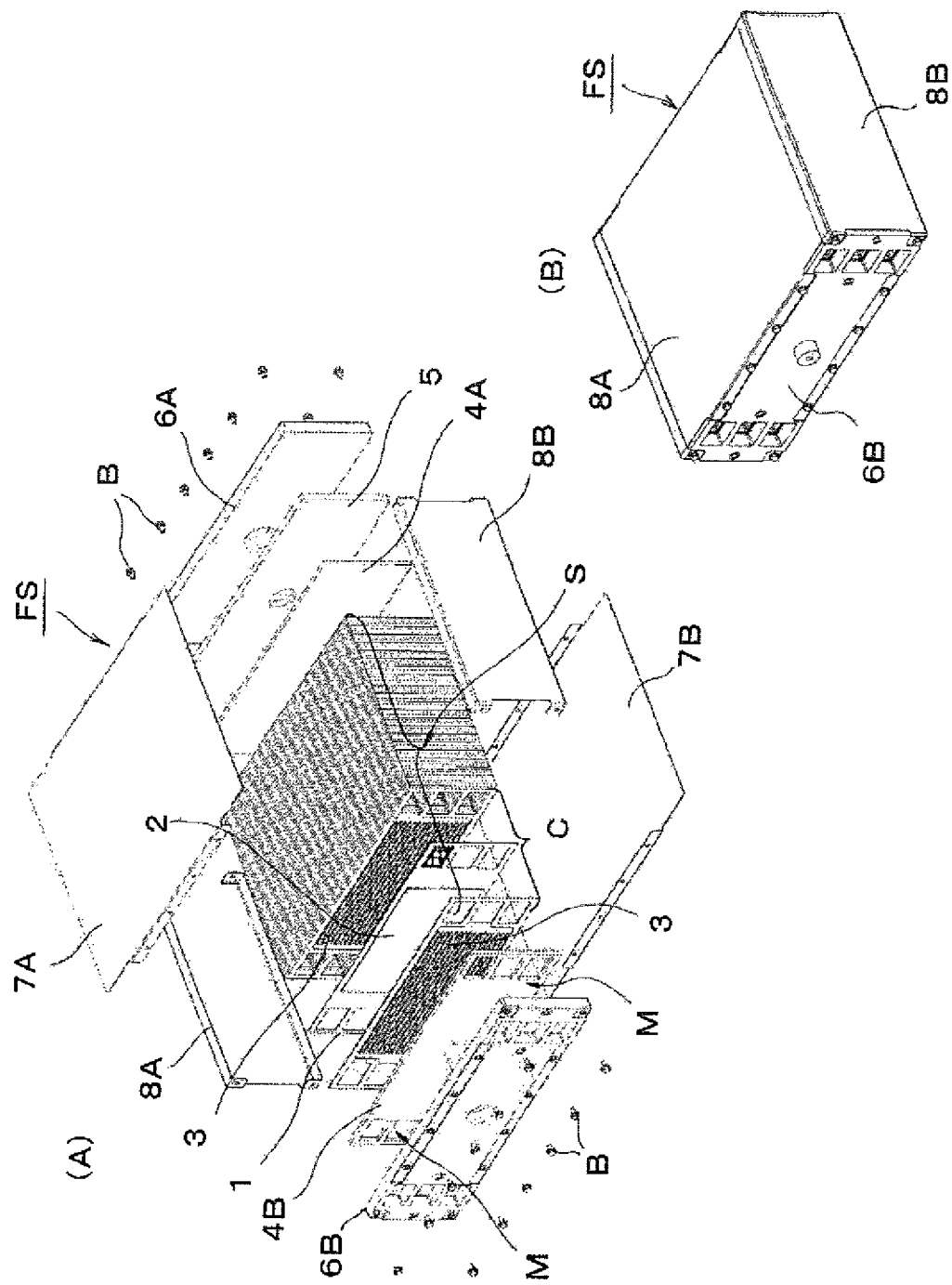
FIG. 3 is: (A) an exploded perspective view illustrating a fuel cell stack including a plurality of the fuel cells of FIG. 1 that are stuck together; and (B) a perspective view of the assembled fuel cell stack.

FIGS. 1 to 3 are views illustrating an embodiment of the fuel cell and the fuel cell stack of the present invention. A fuel cell FC illustrated in FIGS. 1 and 2 includes a membrane electrode assembly 2 with a frame 1 at the peripheral portion, and separators 3, 3 disposed on both sides of the frame 1 and the membrane electrode assembly 2. FIG. 1 is a cross sectional view taken along the line A-A of FIG. 2.

For example, the membrane electrode assembly 2, which is generally referred to as an MEA (membrane electrode assembly), is configured such that an electrolyte layer of a solid polymer is sandwiched between a cathode layer (air electrode layer) and an anode layer (fuel electrode layer). Each of the cathode layer and the anode layer is a laminate of a catalyst layer and a suitable number of gas diffusion layer (not shown in the figures).

The frame 1, which is made of resin, is integrally formed at the peripheral portion of the membrane electrode assembly 2 by injection molding or the like. In the illustrated example, the frame 1 is formed in a rectangular shape with the membrane electrode assembly 2 at the center. Along each short side of the frame 1, three manifold holes (not shown) are arranged. The areas from each set of manifold holes to the membrane electrode assembly 2 serve as flow areas of reaction gas.

In a preferred embodiment, each separator 3 is made of stainless steel, and is formed in a rectangular shape corresponding to the frame 1 and the membrane electrode assembly 2. Each separator 3 has a corrugated transverse cross-section at least in the center part corresponding to the membrane electrode assembly 2. As illustrated in the figure, the corrugation continues in the longitudinal direction.

In the center part of each separator 3 corresponding to the membrane electrode assembly 2, the apexes of the corrugation are in contact with the membrane electrode assembly 2 while the bottoms of the corrugations form gas channels for cathode gas (air) and anode gas (hydrogen gas). Further, as illustrated in FIG. 2, each separator 3 has manifold holes H1 to H6 at both ends that are in communication with the respective manifold holes of the frame 1.

The manifold holes H1 to H3 on one side, i.e. on the left side in FIG. 2, are holes for supplying the cathode gas (H1), supplying cooling fluid (H2) and discharging the anode gas (H3). These manifold holes are communicated with other manifold holes in the lamination direction to form respective channels. Further, the manifold holes H4 to H6 on the other side, i.e. on the right side of FIG. 2, are holes for supplying the anode gas (H4), discharging the cooling fluid (H5) and discharging the cathode gas (H6). These manifold holes are communicated with each other in the lamination direction to form respective channels. The positional relationship between the supply holes and the discharge holes may be suitably changed.

Furthermore, the fuel cell FC includes gas seals between the rims of the frame 1 and each separator 3 and around the manifold holes H1 to H6. If a plurality of the fuel cells FC are stuck together, the gas seals are provided also between the fuel cells FC, i.e. between adjacent separators 3. In this embodiment, cooling flood flows between adjacent separators 3.

These gas seals hermetically separate flow areas of the cathode gas, the anode gas and the cooling fluid from each other in the gaps between layers. Further, the gas seals around the manifold holes H1 to H6 have openings at suitable positions so that predetermined fluid can flow through the gaps between the layers.

A plurality of the fuel cells FC with the above-described configuration are stuck together to form a fuel stack FS as illustrated in FIG. 3. As illustrated in FIG. 3(A), the fuel cell stack FS includes an end plate 6A on one end in the laminate direction (right end in FIG. 3) of a laminate S of the fuel cells FC via a current collector plate 4A and a spacer 5. Further, the fuel cell stack FS includes an end plate 6B on the other end in the lamination direction via a current collector plate 4B. Furthermore, the fuel cell stack FS includes fastening plates 7A, 7B on both faces of the laminate S corresponding to the long sides of the fuel cells FC (upper and lower faces in FIG. 3), and reinforcing plates 8A, 8B on both faces corresponding to the short sides.

In the fuel cell stack FS, each of the fastening plates 7A, 7B and reinforcing plates 8A and 8B is coupled to both end plates 6A and 6B by bolts B. As described above, the fuel cell stack FS has an integrated structure with a case as illustrated in FIG. 3(B), in which the laminate S is restrained and pressed in the lamination direction so that a predetermined contact pressure is applied on each fuel cell FS. With this structure, the gas sealing and the electrical conductivity are maintained at high level.

The fuel cell FC of the present invention, which includes the membrane electrode assembly 2 with the frame 1 and the separators 3, 3 as described above, is configured such that: a protrusion and a counterpart groove where the tip of the protrusion is inserted are formed respectively on the portions of the frame 1 and a separator 3 facing each other; and the groove and the protrusion are joined to each other by the adhesive that is injected in the groove. This sealing structure is provided along the above-described gas seal that is disposed between the rims of the frame 1 and each separator 3.

In the fuel cell FC of this embodiment, as illustrated in FIG. 1, the groove 1G is formed on the frame 1 while the protrusion 3R is formed on the separator 3 in the portions of the frame 1 and the separator 3 that face each other. Further, in the illustrated example, the separator 3 has a recess 3A on the inner face (lower face in FIG. 1), and the protrusion 3R is formed on the center of the bottom of the recess 3A. The groove 1G of the frame 1 and the recess 3A of the separator 3 have approximately the same width.

The groove 1G of the frame 1 may be formed together with the frame 1 by injection molding. The protrusion 3R and recess 3A of the separator 3 may be formed together with the separator 3 by press working or the like.

In the fuel cell FC, an adhesive 10 is injected in the groove 1G of the frame 1, and the tip of the protrusion 3R of the separator 3 is immersed in the adhesive 10 to join the groove 1G and the protrusion 3R to each other, so that the frame 1 and the separator 3 are joined to each other. By this structure of the fuel cell FC, a room 11 that is hermetically separated by the adhesive 10 is formed between the frame 1 and the separator 3 at least at the side of the protrusion 3R closer to the membrane electrode assembly 2. In the illustrated example, rooms 11, 11 are formed at both sides of the protrusion 3R.

In the fuel cell FC and the fuel cell stack FS with the above-described configuration, since the groove 1G and the protrusion 3R are joined to each other by immersing the tip of the protrusion 3A in the adhesive 10 that is injected in the groove 1G, the interface between them is complicated compared to a sealing structure that joins two flat portions to each other. With this configuration, the fuel cell FC can greatly improve the sealing between the frame 1 and the separator 3.

Further, since the room 11, which is hermetically separated by the adhesive 10, is formed between the frame 1 and the separator 3 at the side of the protrusion 3R closer to the membrane electrode assembly 2, the sealing of the fuel cell FC is further improved. That is, in the fuel cell FC, if the reaction gas penetrates from the power generating area (area of the membrane electrode assembly 2, indicated by the arrow in FIG. 1) into the gap between the frame 1 and the separator 3, the reaction gas flows into the inner room 11. Then, the pressure of the gas acts on the surface of the adhesive 10 to pressurize the adhesive 10, i.e. to cause so-called self-sealing. As a result, the reaction gas is completely prevented from leaking out of the adhesive 10.

Furthermore, in the fuel cell FC, since it is only required to provide the adhesive 10 in the groove 1G, the injection of the adhesive 10 is very easy. Also, since the adhesive 10 would not flow out to the other portions, a low-viscosity adhesive can be used as the adhesive 10. As a result, it becomes possible to improve the productivity or to reduce the cost.

Figure 4:
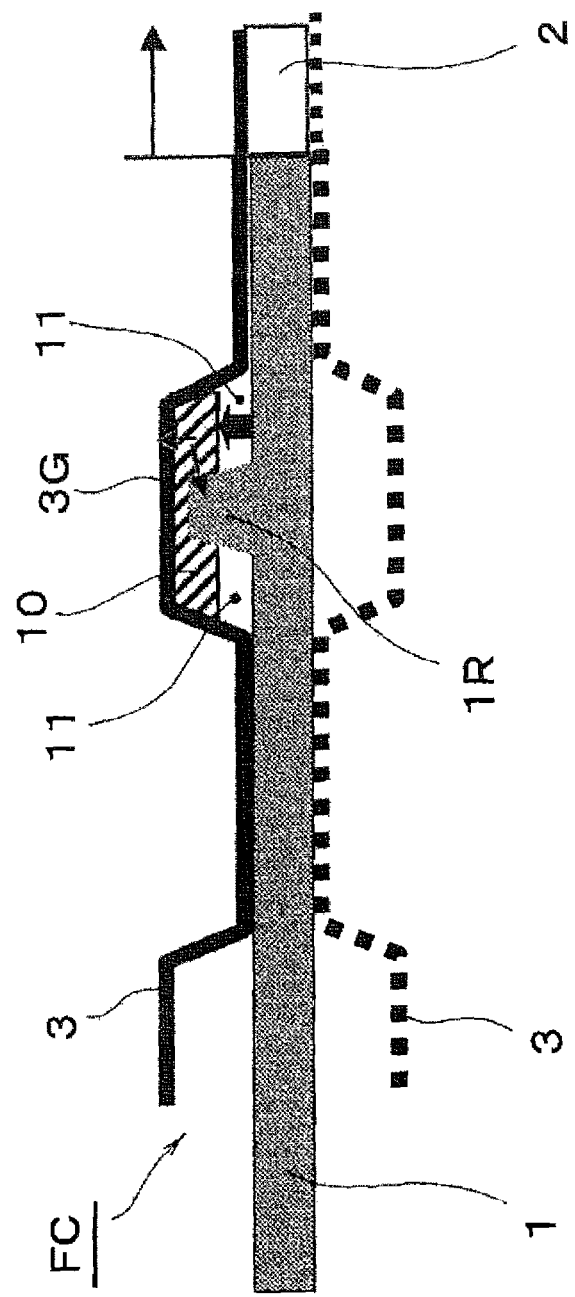
FIG. 4 is a cross sectional view illustrating another embodiment of the fuel cell of the present invention.

A fuel cell FC illustrated in FIG. 4 is configured such that: a protrusion 1R is formed on a frame 1 while a groove 3G is formed on a separator 3; and the tip of the protrusion 1R is immersed in an adhesive 10 that is injected in the groove 3G so that the protrusion 1R and the groove 3G are joined to each other. Further, rooms 11 are formed on both sides of the protrusion 1R, which are hermetically separated by the adhesive 10.

As with the previously described embodiment, the interface between the two members of this fuel cell FC is complicated compared to a structure that joins two flat portions to each other, which can greatly improve the sealing between the frame 1 and the separator 3.

The configuration of the fuel cell of the present invention is not limited to those of the above-described embodiments, and details of the configuration may be suitably changed without departing from the gist of the present invention. In the embodiments illustrated in FIGS. 1 and 4, the protrusion and the counterpart groove are provided on the frame and one of the separators. However, it should be understood that the same structure may also be formed on the frame and the other of the separators.

REFERENCE SIGNS LIST

FC fuel cell
FS fuel cell stack
1 frame
1G groove
1R protrusion
2 membrane electrode assembly
3 separator
3R protrusion 3G groove
10 adhesive
11 room

The invention claimed is:

1. A fuel cell, comprising:
a membrane electrode assembly with a frame at a peripheral portion; and
a separator disposed on both sides of the frame and the membrane electrode assembly,
wherein a protrusion and a counterpart groove where a tip of the protrusion is inserted are respectively formed on portions of the frame and the separator facing each other, and the tip of the protrusion is immersed in an adhesive that is injected in the groove such that the groove and the protrusion are joined to each other, and
a room is formed between the frame and the separator on the groove at least at a side of the protrusion closer to the membrane electrode assembly.

2. The fuel cell according to claim 1, wherein the groove is formed on the frame and the protrusion is formed on the separator.

3. The fuel cell according to claim 1, wherein the protrusion is formed on the frame and the groove is formed on the separator.

4. A fuel cell stack, comprising a plurality of the fuel cells according to claim 1 that are stuck together.

5. A fuel cell stack, comprising a plurality of the fuel cells according to claim 2 that are stuck together.

6. A fuel cell stack, comprising a plurality of the fuel cells according to claim 3 that are stuck together.

* * * * *